(12) United States Patent
Poulbot et al.

(10) Patent No.: US 7,404,319 B2
(45) Date of Patent: Jul. 29, 2008

(54) METHOD AND DEVICE FOR THE CONTINUOUS MEASUREMENT OF THE WEAR OF A TIRE

(75) Inventors: Valéry Poulbot, Les Martres d'Artieres (FR); Michel Robert, Cellule (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 395 days.

(21) Appl. No.: 10/814,476

(22) Filed: Mar. 31, 2004

(65) Prior Publication Data

US 2005/0016649 A1    Jan. 27, 2005

(51) Int. Cl.
*G01M 17/02* (2006.01)
(52) U.S. Cl. ..................................... 73/146.5
(58) Field of Classification Search ............ 73/146, 73/146.2
See application file for complete search history.

(56) References Cited

U.S. PATENT DOCUMENTS

2005/0061069 A1 *  3/2005  Robert ..................... 73/146

FOREIGN PATENT DOCUMENTS

| DE | 197 45 734 A1 | 4/1999 |
| DE | 199 30 046 A1 | 1/2001 |
| EP | WO 01/64460 A1 | 9/2001 |

* cited by examiner

*Primary Examiner*—Andre J. Allen
(74) *Attorney, Agent, or Firm*—Buchanan Ingersoll & Rooney PC

(57) ABSTRACT

A method for the continuous measurement of the wear of a tire comprises the steps of measuring a capacitance or an electrical resistance within a tread pattern element of the tire, and deducing the height of the element with the aid of an equation relating the capacitance or resistance to the height, and devices for implementing the method.

12 Claims, 4 Drawing Sheets

METHOD AND DEVICE FOR THE CONTINUOUS MEASUREMENT OF THE WEAR OF A TIRE

BACKGROUND OF THE INVENTION

The present invention concerns a method for the continuous measurement of the wear of a tire. The invention also concerns an element of a tread pattern for a tire which is provided with means to enable continuous measurement of the wear of the element during the rolling of the tire over a rolling surface, a tread comprising the element, and a tire comprising the tread. The invention also concerns a fitted assembly for an automobile vehicle, and such a vehicle which comprises means for measuring the wear of the tire continuously and in real time.

It is known to provide devices for detecting wear of the tread patterns of tires for automobile vehicles.

German Patent DE-A-197 45 734 (see FIGS. 2 and 3 thereof) discloses a tire whose tread comprises in its mass a plurality of metallic wires which form electrically conducting loops that extend respectively to different heights within a pattern rib of the tread, and which are connected to a detection circuit underneath the rib. During the rolling of a vehicle fitted with this tire, these loops are broken one after the other to form open switches and the detection circuit delivers a signal representative of these breaks to an evaluation unit present in the vehicle.

A major disadvantage of this wear detector is that the wear is detected discontinuously because it is a function of the number of loops successively broken (i.e. the number of open switches).

Another disadvantage of this wear detector is that it seems very difficult for a person engaged in the field to manufacture it in a precise manner.

In the context of the present description, the "fixed part" of a vehicle will be understood as the chassis of the vehicle and the suspension rods, as opposed to the "rotating parts" which include the wheels, tires and hubs.

SUMMARY OF THE INVENTION

One aspect of the present invention is a method for the continuous measurement of the wear of a tire, i.e., one which enables the wear to be measured at any time, whether during rolling of a vehicle fitted with the tire, or else when the vehicle is at rest.

According to the invention, this method consists in measuring the capacitance or electrical resistance inside a tread pattern element of the tire, and deducing the height of the element by virtue of an equation relating the capacitance or resistance to the height.

Preferably, the process consists in using as the tread pattern element an element formed such that its capacitance or resistance is directly proportional to the height of the element. In other words, the height is a linear function of the capacitance or resistance.

Consequently, the acquisition module does not require a complex algorithm (linear transfer function) to measure the height of the tread pattern element.

In this description "tread pattern element" means any relief element of the tire tread which is intended to be in contact with the rolling surface at any time (i.e. from when rolling begins, or after wear of the element has started). Thus, the element can consist of a block of substantially parallelepiped or cylindrical shape, or a "rib" or circumferential ridge whose cross-section varies (i.e. extending over all or part of the circumference of the tread).

According to one example embodiment of the invention, the method consists in effecting the capacitance or resistance measurement by providing within the tire an electronic acquisition module which is connected to the tread pattern element underneath the tread.

According to a first embodiment of the invention in which the tire is mounted on a wheel and fitted to an automobile vehicle, the method consists essentially in effecting a capacitance measurement relating to the pattern element, by determining the tuning frequency of a passive resonance circuit comprising at least one capacitor formed by the pattern element and an inductance connected to the capacitor in the tread of the tire, by means of an interrogation circuit mounted on the wheel or on a fixed part of the vehicle that is adjacent to the wheel.

According to a second embodiment of the invention in which the tire is again mounted on a wheel and fitted on an automobile vehicle, the method consists in effecting a capacitance measurement relating to the tread pattern by remote energizing of the acquisition module via an interrogation circuit mounted on the wheel or on a fixed part of the vehicle that is adjacent to the wheel, and transmitting to the interrogation circuit the capacitance measurement acquired by the module via an inductance coupled within the tire to the acquisition module.

According to a first example embodiment of the invention, the method consists in measuring the capacitance within the tread pattern element, by providing that at least one capacitor is formed in the element.

A capacitor in accordance with the invention can consist of electrically conducting plates forming armatures separated from one another by an electrically insulating rubber composition which forms a dielectric for the capacitor. Each of these plates can be metallic, consisting for example of copper or brass or another metal compatible with the rubber used, or it can consist of an electrically conducting rubber composition, for example one containing a sufficient quantity of carbon black as the reinforcing filler.

A capacitor can alternatively consist of metallic wires, for example of copper or brass.

Note that the use of a capacitor in the tread pattern element enables the energy consumed to be minimized, since the reactive power characterizes the capacitor.

This energy consumption can advantageously be minimized by interrogating the acquisition module when the vehicle is stopped (for example, each time it is started, by inserting the ignition key), by means of a central unit mounted inside the vehicle.

According to a second example embodiment of the invention, the method consists in measuring the resistance in the tread pattern element, by providing that at least one electrical resistance is formed in the element. As before, the resistance can comprise electrically conducting plates (metallic, or of electrically conducting rubber) or else metallic wires such as those mentioned earlier.

Preferably, the plates mentioned above in relation to the capacitor or resistance are flat; however, other shapes or contours are possible.

Another purpose of this invention is to propose a tread pattern element for a tire, the element comprising a base and a crown connected to one another by at least one lateral face which defines the height of the element, the crown being intended, when the tire is rolling over a rolling surface, to be in contact with the ground at one time or another, and such that in relation to an acquisition module to which it is connected, the structure of the element makes it possible to measure the wear of the tread continuously.

To that end, a tread pattern element according to the invention comprises n conducting layers face to face with one another and of the same height (n being an integer≧2) and n−1 insulating layer(s) which consist respectively of electrically conducting and insulating rubber compositions, two adjacent conducting layers being separated from one another by an insulating layer which extends a complete height of the conducting layers (case (i)) or part of the height of the conducting layers (case (ii)) in a direction normal to that of the crown, such that the element defines at least one capacitor in the case (i) or at least one electrical resistance in the case (ii), which respectively have a capacitance C or resistance R value representative of the height of the element.

It follows that the height of the tread pattern element can be determined at any time during rolling from the value of the capacitance of the capacitor(s) or resistance(s) that it forms, this capacitance or resistance value being measurable by an electronic acquisition module which is connected to the tread pattern element underneath the latter, inside the tread.

Note that in the case where the pattern element consists of a circumferential "rib" or ridge of given cross-section, the aforesaid conducting or insulating layers extend over the full circumference of the tread.

Note also that the capacitors or resistors formed in such tread pattern elements advantageously consist of the rubber compositions customarily used for making tire treads, which facilitates the fabrication of the treads and so minimizes their cost.

Furthermore, when the capacitor or resistor is made of rubber, this imparts better cohesion to the tread of the corresponding tire (compared with the cohesion between metallic parts and rubber parts). The improved cohesion results in performances of the tire, such as wear or grip, which are not appreciably degraded during rolling.

According to an example embodiment of the invention, the conducting layers are positioned with one end on a level with the crown, and each insulating layer has one end on a level with the crown in the case (i) capacitor or the one end a distance away from the crown in the case (ii) resistor.

As a result, the wear of the tread pattern element can be measured continuously from the beginning of rolling, for a tread pattern element in contact with the rolling surface from the time rolling begins.

The conducting layers on the one hand, and the at least one insulating layer on the other hand, have a radially-inner end on a level with the base.

According to a first embodiment of the invention, the conducting layers and insulating layer(s) are rectangular and are stacked over one another so as to impart a parallelepiped shape to the element.

A tread pattern element according to this embodiment of the invention can form a capacitor, if it consists of two electrically conducting layers of rectangular shape (whether parallel or not) applied against an electrically insulating layer such that the three layers are face to face and all three have a first end on a level with the base, and a second, opposite end on a level with the crown. The armature plates and the dielectric of the capacitor consist respectively of the conducting layers and the insulating layer.

As a variant, a tread pattern element according to the invention can form several capacitors in series, for example comprising three electrically conducting layers which are identical and of rectangular shape, with two electrically insulating layers applied respectively between a first and a second pair of adjacent conducting layers. All these layers are again face to face with one another with a first end on a level with the base on the one hand and a second opposite end on a level with the crown on the other hand. The armature plates and the dielectric of this capacitor consist respectively of the conducting layers and the insulating layers.

A tread pattern element according to the invention can also form a resistance, comprising two identical and rectangular electrically conducting layers applied on an electrically insulating layer, such that the layers are face to face with one another and all three have a first end on a level with the base of the tread pattern element. The insulating layer only partially extends the height of the conducting layers, so that the conducting layers are connected to one another by a third, median conducting layer which extends the insulating layer to a given height (representing the height of the wear to be measured) in the direction of the crown of the tread pattern element, the three conducting layers having radially outer ends on a level with the crown.

In a second embodiment according to the invention, the conducting and insulating layer(s) are concentric and are positioned one inside the other, whether or not they are closed upon themselves. For example, the layers can be cylindrical and positioned coaxially against one another, so as to confer upon the element the geometry of a solid cylinder or part-cylinder.

A tread pattern element according to this variant of the invention can for example form a capacitor, and consists of cylindrical and coaxial layers of the same height comprising two electrically conducting layers between which is applied an electrically insulating layer, such that these layers are face to face and having a first end on a level with the base and a second opposite end on a level with the crown. The armature plates and the dielectric of this capacitor consist respectively of the conducting layers and the insulating layer.

According to another aspect of the invention, the element consists of an electrically insulating rubber composition in which are embedded at least two identical, electrically conducting wires parallel to one another, so as to form at least one capacitor (a single capacitor, or several capacitors arranged in series) whose dielectric and armature plates are formed respectively by the insulating composition and the wires, the capacitor having a capacitance value at any moment which is representative of the height of the element at that moment.

According to an example embodiment of the invention, the wires have a first end on a level with the base, and an opposite end on a level with the crown.

It follows that the height of this tread pattern element can be determined during rolling, from the capacitance value of the capacitor(s) that it forms, this capacitance being measured by an electronic acquisition module connected to the tread pattern element under the latter, within the tread.

A tread of a tire according to the invention is such that it comprises at least one tread pattern element such as one of those described above.

Note that when the tread pattern element consists of a capacitor or resistance formed of the conducting layers and insulating layer(s) of rubber and if the composition of the tread or the tread underlayer has a reduced resistivity (for example, similar to that of the conducting layers), then the tread or its underlayer must necessarily also comprise an insulating layer arranged radially underneath the tread pattern element so as to cover its base entirely, whose purpose is to insulate the tread pattern element electrically from the tread or underlayer composition. This insulating layer, whose thickness is advantageously small, can for example consist of a rubber composition whose resistivity is analogous to that of the at least one insulating layer of the capacitor or resistance forming the tread pattern element (i.e. with resistivity for example between $10^{12}$ and $10^{15}$ $\Omega$.cm).

According to another characteristic of the invention, the tread comprises in its mass an electronic acquisition module which is connected to the at least one element underneath the latter and is designed to measure the value of the capacitance or resistance of the capacitor(s) in the case (i) or of the resistance(s) in the case (ii), and to deduce therefrom the height of the at least one tread pattern element during the rolling of the tire.

For example, the acquisition module can also be designed to emit signals representative of the capacitance or resistance values towards a central unit mounted inside a vehicle fitted with the tire.

According to a variant embodiment of the invention, the acquisition module is also designed to be remotely energized by an interrogation circuit mounted on the wheel or on a fixed part of the vehicle adjacent to the wheel, and to cooperate by coupling with an inductance provided within the tread so as to transmit to the interrogation circuit the capacitance measurement acquired by the module.

A tire according to the invention is such that it comprises a tread such as that described above.

According to an example embodiment of the invention, the tire is such that its tread comprises, as the pattern element according to the invention, a circumferential "rib" or ridge extending all round the circumference of the tread.

According to another example embodiment of the invention, the tire is such that its tread comprises, as the pattern element according to the invention, an element consisting of a "wear indicator", i.e. an element for example in the form of a block or ridge whose height is substantially less than that of the other tread pattern elements.

A further purpose of the present invention is to propose a mounted assembly for an automobile vehicle comprising a tire and a wheel on which the tire is fitted, the tire comprising a tread having pattern elements each with a base and a crown connected to one another by at least one lateral face and which define the height of the element, the crown being intended, when the tire is rolling on a rolling surface, to be in contact at one time or another with the surface, at least one of the tread pattern elements of the tire having n conducting layers face to face with one another and of the same height (n being an integer$\geq$2) and n-1 insulating layer(s), which consist respectively of electrically conducting layers and insulating layer(s) of rubber, such that two adjacent conducting layers are separated from one another by an insulating layer which extends to the height of the conducting layers in a direction normal to that of the crown, in such manner that the element defines a capacitor whose capacitance value is representative of the momentary height of the element.

According to a "passive" embodiment of the invention (passive components in the tire), this mounted assembly is such that the tread has in its mass a resonance circuit one of whose elements is the capacitor. The resonance circuit is such that its resonance frequency is a function of the capacitance of the capacitor. For example, the resonance circuit comprises an inductance mounted under the tread pattern element, and the capacitor to whose armature plates the inductance is connected, the resonance circuit being coupled to an interrogation circuit which is attached permanently to the wheel and is provided with a frequency-scanning energy generator and means of detection provided to detect the frequency at which the circuits are in tune, so as to deduce from this tuned frequency the capacitance value of the capacitor and to deduce from that value the height of the tread pattern element.

The interrogation circuit can for example comprise a frequency-scanning energy generator, a capacitor, an inductance coupled to the inductance of the resonance circuit and a resistance, and the means for detecting the tuning frequency are for example mounted at the terminals of the resistance to measure the voltage between those terminals.

According to another, "active" embodiment of the invention (active components in the tire, in contrast to the "passive" mode), the mounted assembly is such that the tire tread has in its mass, on the one hand an acquisition module designed to measure the capacitance value and which is remotely energized by an interrogation circuit mounted on the wheel, and on the other hand an inductance coupled to the acquisition module to transmit to the interrogation circuit the capacitance measurement acquired by the module, the interrogation circuit comprising means for deducing the height of the tread pattern element from the capacitance value.

Note that in accordance with these two embodiments, the interrogation circuit can for example be mounted on the valve fitted to the wheel (and in this case one speaks of an instrumented valve), on a module for measuring the internal pressure of the tire that can be fitted to the wheel, more generally on an existing device mounted on the wheel, or even at a given location in the surface over which the wheel rolls.

A further aspect of the present invention is an automobile vehicle provided with tires whose respective treads each comprise tread pattern elements, each element comprising a base and a crown connected to one another by at least one lateral face which defines the height of the element, the crown being intended, when the tire is rolling on a rolling surface, to be in contact with the ground at one time or another, and the vehicle comprising means for continuously measuring the wear of at least one of the tires, such means not including any electrically active component at all in the tire, at least one tread pattern element of at least one of the tires comprising n conducting layers face to face and of the same height (n being an integer$\geq$2) and n-1 insulating layer(s) which consist respectively of electrically conducting layers and insulating layer(s) of rubber, two adjacent conducting layers being separated from one another by an insulating layer which covers them entirely in a direction normal to the crown, in such manner that the element defines a capacitor whose capacitance value is representative of the height of the element.

According to an embodiment of the invention, the vehicle is such that the tread of the at least one tire has in its mass a resonance circuit comprising an inductance mounted underneath the tread pattern element and the capacitor to whose armature plates the inductance is connected, the resonance circuit being coupled to an interrogation circuit attached to a fixed part of the vehicle close to the tire, and the interrogation circuit is provided with a frequency-scanning energy generator and with detection means to detect the in-tune frequency between the circuits, in order to deduce from that tuned frequency the capacitance value of the capacitor and, from that capacitance value, to deduce the height of the pattern element, the interrogation circuit also being designed to communicate with a central unit provided in the cockpit of the vehicle.

Note that this tire has in its mass only electrically passive components.

According to an example embodiment of the invention, the interrogation circuit comprises a frequency-scanning energy generator, a capacitor, an inductance coupled to the inductance of the resonance circuit, and a resistance, and the resonance frequency detection means are mounted for example at the terminals of the resistance to measure the voltage between those terminals.

According to another embodiment of the invention, the vehicle is such that the tread of the at least one tire has in its mass, on the one hand an acquisition module designed to measure the capacitance value and which is remotely energized by an interrogation circuit attached to a fixed part of the vehicle adjacent to the tire, and on the other hand an inductance coupled to the acquisition module to transmit to the interrogation circuit the capacitance measurement acquired by the module, the interrogation circuit having means for deducing the height of the tread pattern element from this capacitance value, and the interrogation circuit also being able to communicate with a central unit provided in the cockpit of the vehicle.

The aforesaid characteristics of the present invention, and others, will be better understood on reading the following description of an example embodiment of the invention, which is given for illustrative and non-limiting purposes, the description relating to the attached drawings which show:

DETAILED DESCRIPTION

Figure 1:
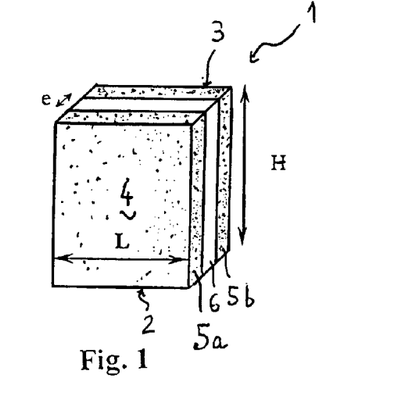
FIG. 1 is a schematic, perspective view of a tread pattern element according to a first example of a first embodiment of the invention

In this example, the tread pattern element 1 in FIG. 1 has a parallelepiped shape. It is delimited by a base 2, a crown 3 intended to evolve against the ground during the rolling of a tire whose tread comprises such an element 1, and lateral faces 4 which connect the crown 3 to the base 2.

This tread pattern element 1 consists of two electrically conducting layers 5a and 5b which are identical and of rectangular shape (of height H and width L), which are applied against an electrically insulating layer 6 (of thickness e) so that the layers 5a, 5b and 6 are face to face with one another and each extends in height from a level with the base 2 at one end, to a level with the crown 3 at the opposite end.

As can be seen in FIG. 1, this stack of layers 5a, 5b and 6 forms a capacitor whose armature plates and dielectric consist respectively of the conducting layers 5a and 5b and of the insulating layer 6.

The capacitance of this capacitor is given by the formula:

$$C = \varepsilon_0 \varepsilon_r \frac{LH}{e} \qquad (1)$$

where $\varepsilon_o$ is the permittivity of a vacuum and $\varepsilon_r$ is the relative permittivity of the dielectric.

It follows that the height H of the tread pattern elements of a rolling tire can be determined from the value of the corresponding capacitor's capacitance, that capacitance being measurable for example by an electric acquisition module connected to the element 1 under the latter, within the tread.

The acquisition module can be adapted to emit signals representative of these capacitance measurements, towards a central unit mounted inside the vehicle equipped with the tire and designed to inform the driver continuously about the wear of the tread pattern elements 1.

Figure 6:
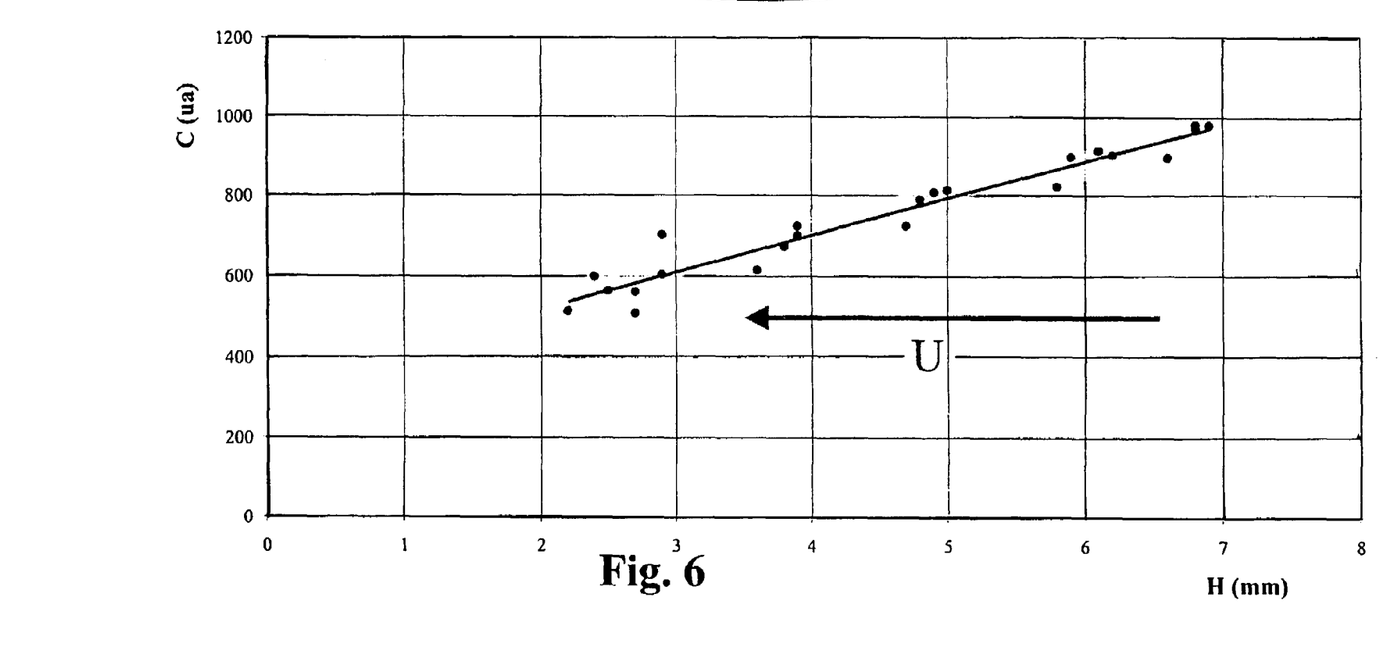
FIG. 6 is an experimental graph illustrating, for four tread pattern elements having the same geometry (represented in the medallion) identical to that of FIG. 1 and centered on the same circumferential plane of a tire, the relation between the height of each of the four pattern elements and the capacitance of the capacitor constituted by that element.

Tests carried out on tires four tread pattern elements 1 of which, aligned in the circumferential direction, have the capacitor structure described in relation to FIG. 1, satisfactorily confirm this relation of proportionality between the height H (in mm) and the capacitance C (expressed in arbitrary units), as shown by the graph of FIG. 6 in which the four "bunches" of points obtained correspond to these four tread pattern elements 1.

The tread pattern element 1 of the tire represented in a medallion in FIG. 6, which is of parallelepiped shape, has an initial height $H_i$ of 8 mm, a width of 20 mm, a depth of 20 mm and an insulating layer 6 of thickness e equal to 2 mm.

The composition of the rubber used in each of the four tread pattern elements 1 for the insulating layer 6 is of the type used in the treads of the "MXT ENERGY" brand tires, i.e. having a resistivity between $10^{12}$ and $10^{15}$ Ω.cm. This composition is based on a blend of a styrene/butadiene copolymer prepared in solution (S-SBR) and a polybutadiene (BR), and comprises 80 phr of "ZEOSIL 1165 MP" silica as the reinforcing filler.

The rubber composition used for the conducting layers 5a and 5b has a resistivity close to $10^8$ Ω.cm, and is based on a S-SBR/BR blend containing 60 phr of "N234" carbon black as the reinforcing filler.

The curve represents the results obtained for the wear of the tire. The direction of the wear has been indicated by the arrow U.

For the description of the next figures, the numerical indexes used have been increased by 10 to identify elements whose structure or function are analogous to the elements described earlier in relation to FIG. 1.

Figure 2:
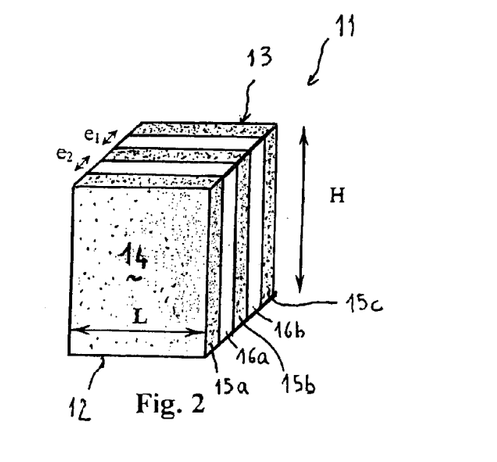
FIG. 2 is a schematic, perspective view of a tread pattern element according to a second example of the first embodiment of the invention.

The tread pattern element 11 of FIG. 2 differs from the element 1 of FIG. 1 only in that it consists of three electrically conducting layers 15a, 15b and 15c, which are identical and of rectangular shape (of height H and width L), with two electrically insulating layers 16a and 16b (of respective thickness $e_1$ and $e_2$) respectively applied, on the one hand between the conducting layers 15a and 15b, and on the other hand between the conducting layers 15b and 15c.

These layers 15a, 16a, 15b, 16b, 15c are again face to face with one another and extend in height from a level with the base 12 at one end to a level with the crown 13 at the opposite end, so that the stack forms two capacitors arranged in series, whose armature plates and dielectrics consist respectively of two adjacent conducting layers 15a and 15b or 15b and 15c, and of the insulating layers 16a or 16b.

The total capacitance C of the capacitors is given by the formula:

$$C = \varepsilon_0 \varepsilon_r \frac{LH}{e_1 + e_2} \tag{2}$$

As before, it follows that the height H of the tread pattern elements 11 of a rolling tire can be determined at any time from the total capacitance value of the corresponding capacitors, that capacitance being measurable for example by an electronic acquisition module connected to the capacitor formed by the element 11 underneath the latter, inside the tread.

This acquisition module can be designed to emit signals representative of the capacitance measurements towards a central unit inside the vehicle, which is intended to inform the driver continuously about the wear of the elements 11.

Figure 3:
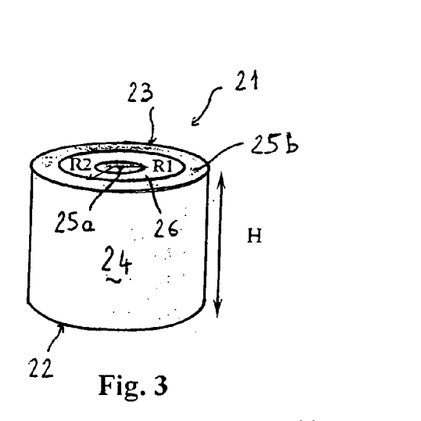
FIG. 3 is a schematic, perspective view of a tread pattern element according to a second embodiment of the invention.

The tread pattern element 21 of FIG. 3 has in this example a cylindrical shape, delimited by a base 22, a crown 23 and lateral faces 24, in the manner of the element 1 of FIG. 1.

This tread pattern element 21 consists of cylindrical and coaxial layers 25a, 25b, 26 (having the same height H), which comprise two electrically conducting layers 25a and 25b between which is applied an electrically insulating layer 26, such that these layers 25a, 25b and 26 are face to face with one another and each extend in height from a level with the base 22 at one end to a level with the crown 23 at the opposite end. The radially internal conducting layer 25a and the insulating layer 26 have radii $R_1$ and $R_2$ respectively (and consequently, the insulating layer 26 has thickness equal to $R_2 - R_1$).

As can be seen from FIG. 3, this stack of layers 25a, 25b, 26 forms a capacitor, whose armature plates and dielectric consist respectively of the conducting layers 25a and 25b, and of the insulating layer 26.

The capacitance C of this capacitor is given by the formula:

$$C = \frac{2\pi\varepsilon_0\varepsilon_r H}{\text{Log}\left(\frac{R_2}{R_1}\right)} \tag{3}$$

As before, it follows that the height of the tread pattern elements 21 of a rolling tire can be determined at any time, from the capacitance value of the corresponding capacitor, which can for example be measured by an electronic acquisition module connected to the capacitor formed by the element 21 underneath the latter, inside the tread.

The acquisition model can be designed to emit signals representative of these capacitance measurements towards a central unit inside the vehicle, which is intended to inform the driver continuously about the wear of the elements 21.

Figure 4:
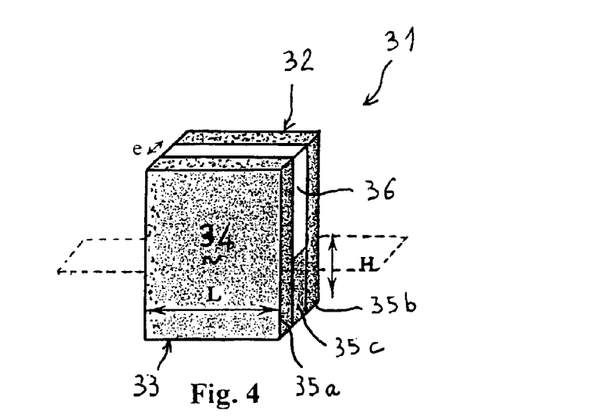
FIG. 4 is a schematic, perspective view of a tread pattern element according to a third example of the first embodiment of the invention.

In the example of FIG. 4, the tread pattern element 31 has a parallelepiped shape, delimited by a base 32, a crown 33 and lateral faces 34.

This tread pattern element 31 comprises two electrically conducting layers 35a and 35b, which are identical and of rectangular shape (of width L), which are applied against an electrically insulating layer (of thickness e and height $H_o$) such that the layers 35a, 35b and 36 are face to face with one another and are at a first end on a common level with the base 32 of the element 31.

As can be seen in FIG. 4, the insulating layer 36 only partially covers each of the conducting layers 35a and 35b, so that the conducting layers are connected to one another by a third, intermediate conducting layer 35c (also of thickness e) which extends the insulating layer 36 by a height H towards the crown 33 of the element 31, the three conducting layers 35a, 35b, 35c each having an upper end on a common level with the crown 33.

It follows from the presence of the intermediate conducting layer 35c and the insulating layer 36 between the conducting layers 35a and 35b, that the element 31 forms an electrical resistance whose value satisfies, to the first order, the formula:

$$R = \rho \frac{e}{LH} \tag{4}$$

where ρ is the resistivity of the conducting layer 35c.

By defining the tread pattern element 31 as presenting a height, relative to the immediately adjacent surfaces of the tire tread (these reference surfaces are represented in FIG. 4 by broken lines), which is equal to the height H of the intermediate conducting layer 35c, it follows from formula (4) that the height H of the tread pattern elements 31 of a rolling tire can be determined at any time for the value of the corresponding resistance, the resistance being measurable for example by an electronic acquisition model connected to the resistance formed by the element 31 underneath the latter, inside the tread.

This acquisition module can be designed to emit signals representative of these resistance measurements towards a central unit inside the vehicle, which is intended to inform the driver continuously about the wear of the elements 31.

Note that the wear of the tread pattern element 31 that corresponds to zero value of the height H of the intermediate conducting layer 35c (i.e. the relative height of this element 31), is reached for a theoretically infinite (in practice very high) value of the resistance R, and is then equivalent to a capacitor capacitance.

Figure 7:
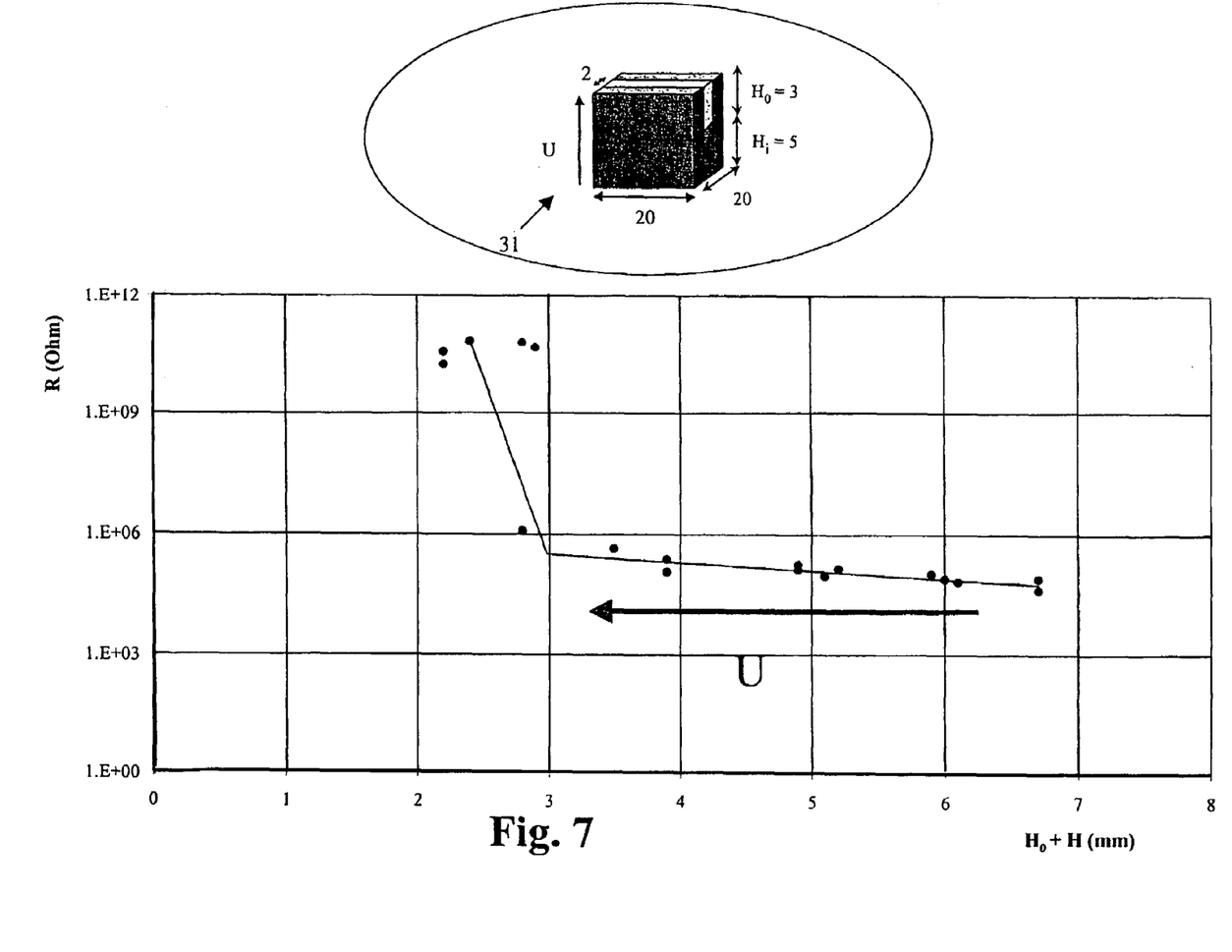
FIG. 7 is an experimental graph illustrating, for four other tread pattern elements having the same geometry (represented in the medallion) identical to that of FIG. 4 and centered on the same circumferential plane of a tire, the relation between the height of each of the four pattern elements and the capacitance of the capacitor constituted by that element.

Tests carried out on tires, four tread pattern elements 31 of which, aligned in the circumferential direction, have the resistance structure described above in relation to FIG. 4, satisfactorily confirm this relation of proportionality between the relative height H and the resistance R, as shown by the graph of FIG. 7 in which the four "bunches" of points obtained correspond to the four tread pattern elements 31.

In this graph of FIG. 7, the resistance R is measured as a function of the total height $H_o + H$ (the pattern element 31 has an initial relative height $H_i$ of 5 mm and an insulating layer 36 of thickness e equal to 2 mm and height $H_o$ equal to 3 mm). The wear direction is indicated by the arrow U.

The rubber composition used in this tread pattern element 31 for the insulating layer 36 is of the tire used in the tread of the "MXT ENERGY" brand tires, i.e. its resistivity is between $10^{12}$ and $10^{15}$ Ω.cm. This composition is based on a S-SBR/BR blend and it contains 80 phr of "ZEOSIL 1165 MP" silica as the reinforcing filler.

The rubber composition for the conducting layers 25a, 35b and 35c has a resistivity close to $10^8$ Ω.cm, is based on a S-SBR/BR blend, and contains 60 phr of "N234" carbon black as the reinforcing filler.

Figure 5:
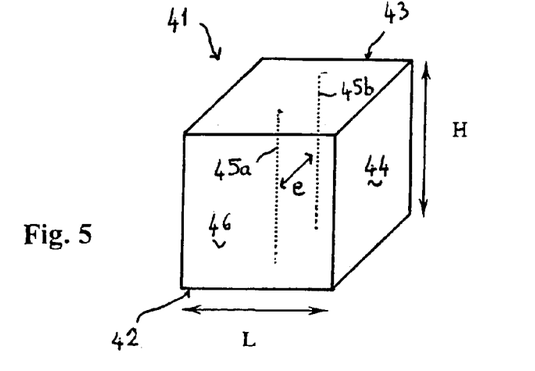
FIG. 5 is a schematic, perspective view of a tread pattern element according to a third embodiment of the invention.

The tread pattern element 41 of FIG. 5 has in this example a parallelepiped shape delimited by a base 42, a crown 43 and lateral faces 44.

This tread pattern element 41, of height H and width L, consists of an electrically insulating rubber composition 46 in which are embedded two identical wires 45a and 45b (shown as dotted lines in FIG. 5) parallel to one another and electrically conducting, so as to form a capacitor whose dielectric and armature plates are formed respectively by the insulating composition 46 and the wires 45a and 45b. The wires 45a and 45b are positioned a distance e apart and each wire has the same diameter D and the same height H, such that they extend from a level with the base 42 at one end to a level with the crown 43 of the element 41 at an opposite end. The capacitance C of this capacitor is given by the formula:

$$C = \frac{\pi \varepsilon_0 \varepsilon_r H}{\operatorname{Arcch}\left(\frac{e}{D}\right)} \quad (5)$$

in which Arcch is the argument function of the hyperbolic cosine.

As before, it follows that the height H of the tread pattern elements H of a rolling tire can be determined at any time from the capacitance value of the corresponding capacitor, which capacitance can be measured for example by an electronic acquisition module connected to the capacitor formed by the element 41 underneath the latter, inside the tread.

The acquisition module can be designed to emit signals representative of these capacitance measurements towards a central unit inside the vehicle, which is intended to inform the driver continuously about the wear of the elements 41.

Figure 8:
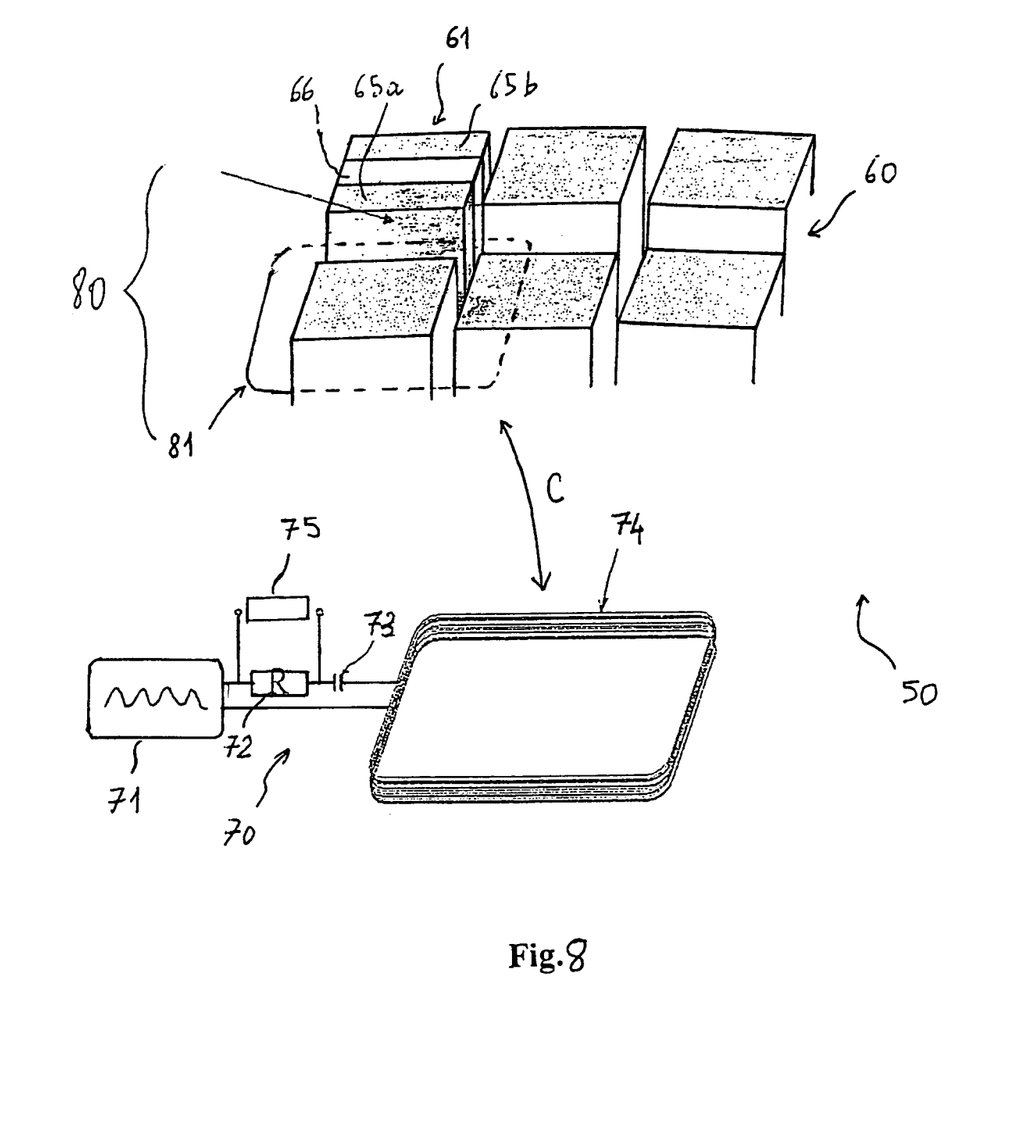
FIG. 8 is a schematic, perspective view of a system according to an example embodiment of the invention, for determining the height of a tread pattern element.

FIG. 8 illustrates an example embodiment according to the invention of a system 50 for the continuous measurement in real time of the wear of a tire tread 60 during rolling, the system 50 being designed for fitting in an automobile vehicle.

The tread 60, which is shown partially and in perspective in FIG. 8, comprises a plurality of tread pattern elements 61 at least one of which confirms to the present invention and forms a capacitor whose capacitance value C is proportional to the height of the element 61. The capacitor 61 can for example be of the type described with reference to any of FIGS. 1, 2 or 3 (in the example of FIG. 8 it is a capacitor according to FIG. 1).

It is understood that several, or even all the tread pattern elements 61 of the tread 60 could consist of such capacitors according to the invention.

The measurement system 50 comprises on the one hand an interrogation circuit 70 (or primary circuit), and on the other hand a resonance circuit 80 (or secondary circuit) coupled electromagnetically to the primary circuit and located in the tread 60.

The interrogation circuit 70 is mounted permanently on a fixed part of the vehicle (not shown), such as the mudguard adjacent to the tire, or else it can be mounted on the wheel itself, for example on the valve or on an internal pressure measurement module with which the wheel is provided.

In this example embodiment, the interrogation circuit 70 comprises a frequency scanning energy generator 71, a resistance 72, a capacitor 73, and an antenna 74 formed by an inductance. Note that this circuit 70 could have no resistance 72, i.e. it could consist of a capacitor 73 associated with an inductance 74.

The resonance circuit 80, which is electrically passive, is an "LC" circuit comprising an antenna 81 formed by an inductance connected to the armature plates 65a and 65b of the capacitor formed by the tread pattern element 61. This inductance 81 is located under the element 61, inside the tread 60, and is coupled (see arrow C) to the inductance 74 of the circuit 70.

The interrogation circuit 70 is provided with means 75 for detecting the in-tune frequencies $f_o$ (also known as resonance frequencies $f_r$) between the resonance circuit 80 and the interrogation circuit 70. The detection means 75 are connected across the terminals of the resistance 72 and is for example designed to measure the voltage amplitude across those terminals, which passes through an optimum (energy absorption) when there is a frequency match $f_o$ between the two circuits.

The system 50 operates as follows to measure the height H of the tread pattern element 61.

The energizing frequency of the generator 71 is varied continuously, and the voltage across the terminals of the resistance 72 is measured to determine the frequency $f_o$ at which the resonance circuit 80 is tuned to the interrogation circuit coupled to it. From this value $f_o$, the value of the capacitance C of the capacitor formed by the element 61 is deduced, using the equation linking the tuned frequency $f_o$ (or tuned pulsation $\omega_o$) and the capacitance C:

$\overline{\omega}_o^2 LC=1$ (L being the self-induction coefficient of the inductance 81), so that if $\overline{\omega}=2\pi f_0$:

$(2\pi f_0)^2 LC=1$.

From this, the aforesaid height H is deduced using one or other of the aforesaid formulas (1), (2) or (3) given with reference to FIGS. 1, 2 and 3.

Note that the system 50 for measuring the height H of the tread pattern element 61 is designed to measure indirectly the capacitance C of the capacitor formed by the element 61 (via the tuned frequency $f_o$), in contrast to the aforesaid acquisition module mentioned in relation to FIGS. 1, 2, 3 and 5, which measures the capacitance directly.

Moreover, this system 50 has an advantage in that it comprises only one, passive electrical circuit within the tire, since the wear is detected remotely (whether on a fixed part of the vehicle, or on the wheel).

The method and devices according to the invention have the decisive advantage of indicating the wear of a tire at all times. Of course, it is not necessary to effect this wear measurement all the time, but at various time intervals.

The invention has been described in terms of preferred principles, embodiments, and structures for the purposes of description and illustration. Those skilled in the art will understand that substitutions may be made and equivalents found without departing from the scope of the invention as defined by the appended claims.

What is claimed is:

1. A method of informing a vehicle's driver about the wear of a tire on the vehicle, the tire including a tread with a pattern element having a given height and forming one of a capacitor or a resistor, the capacitance of the capacitor or the resistance of the resistor being related to the height of the tread pattern by a respective equation, the method comprising the steps of:
    A) causing electrical circuitry operably connected to the capacitor or the resistor to:
        A1) measure the capacitance of the capacitor or the resistance of the resistor, and
        A2) calculating from such measurement a height component of the tread pattern element in accordance with the respective equation; and
    B) transmitting to a location near the driver a signal related to the calculated height component for informing the driver about the tire's wear.

2. The method according to claim 1 wherein steps A and B are performed continuously.

3. The method according to claim 1 wherein the capacitor or the resistor is connected to electrical circuitry disposed in an acquisition module which rotates with the tire in step A.

4. The method according to claim 3 wherein the tire is mounted on a wheel, the acquisition module being mounted on the tire in step A.

5. The method according to claim 3 wherein the tire is mounted on a wheel, the acquisition module being mounted on the wheel in step A.

6. The method according to claim 3 wherein the acquisition module is mounted on a fixed part of the vehicle so the tire rotates relative to the acquisition module in step A.

7. The method according to claim 3 wherein the capacitor or the resistor comprises part of a passive circuit on the tire which is energized by an interrogating circuit of the electrical circuitry in step A.

8. The method according to claim 7 wherein the capacitor or the resistor is operably connected to the electrical circuitry by induction in step A.

9. The method according to claim 1 wherein the capacitance or resistance is generated by electrically conducting plates in the tire pattern element, the plates defining armatures and being mutually separated by rubber of the tire pattern element.

10. A method of continuously informing a vehicle's driver about the wear of a tire mounted on a wheel of the vehicle, the tire including a tread with a pattern element having a given height and forming a capacitor, the capacitance of the capacitor or the resistance of the resistor being related to the height of the tread pattern element by an equation, the method comprising the steps of:
  A) measuring the capacitance of the capacitor or the resistance of the resistor;
  B) calculating from such measurement the height of the tread pattern element in accordance with the equation;
  C) transmitting to a location near the driver a signal related to the calculated height component for informing the driver about the tire's wear;
  D) performing step A by an interrogation circuit which is operably connected by inductance to a passive resonance circuit containing the capacitor or the resistor for determining an in-tune frequency of the passive resonance circuit; and
  E) performing steps A-D continuously.

11. The method according to claim 10 wherein the tire rotates relative to the interrogation circuit during steps A-E.

12. The method according to claim 10 wherein the acquisition circuit rotates with the tire during steps A-E.

* * * * *